United States Patent [19]
Haddick et al.

[11] Patent Number: 5,379,733
[45] Date of Patent: Jan. 10, 1995

[54] FUEL SHUT-OFF SOLENOID PULL-IN COIL RELAY

[75] Inventors: Brian J. Haddick, Beaver Dam; Rudolph A. Peterson, Jr., Horicon, both of Wis.

[73] Assignee: Deere & Company, Moline, Ill.

[21] Appl. No.: 145,363

[22] Filed: Oct. 29, 1993

[51] Int. Cl.6 .................... F02N 17/00; F02B 77/00
[52] U.S. Cl. ...................... 123/179.17; 123/198 DB
[58] Field of Search ........... 123/179.3, 179.17, 179.16, 123/198 D, 198 DB, 458

[56] References Cited

U.S. PATENT DOCUMENTS

| | | | |
|---|---|---|---|
| 3,738,346 | 6/1973 | Goodman | 123/198 DB |
| 3,744,467 | 7/1973 | Wagner | 123/179.3 |
| 4,077,381 | 3/1978 | Firey | 123/179.17 |
| 4,102,316 | 7/1978 | Valbert | 123/198 DB |
| 4,200,079 | 4/1980 | Darlington | 123/179.17 |
| 4,494,497 | 1/1985 | Uchida et al. | 123/179.17 |
| 4,602,600 | 7/1986 | Akatsuka et al. | 123/179.17 |
| 4,685,431 | 8/1987 | Kuboto et al. | 123/198 DB |
| 4,741,306 | 5/1988 | Watanabe et al. | 123/198 DB |
| 4,867,115 | 9/1989 | Henein | 123/179.17 |
| 4,924,827 | 5/1990 | Minegishi | 123/198 DB |
| 5,072,702 | 12/1991 | Sasaki et al. | 123/179.4 |

*Primary Examiner*—E. Rollins Cross
*Assistant Examiner*—Thomas N. Moulis

[57] ABSTRACT

The pull-in coil of a fuel shut-off solenoid on an engine is connected to a relay which in turn is connected to the engine starting circuit. The relay is connected through the oil pressure light switch which opens after a short period of time as the result of a change in oil pressure as the engine is being cranked. Solenoid overheating is avoided since the relay pull-in coil current is cut off as soon as the oil pressure rises.

7 Claims, 1 Drawing Sheet

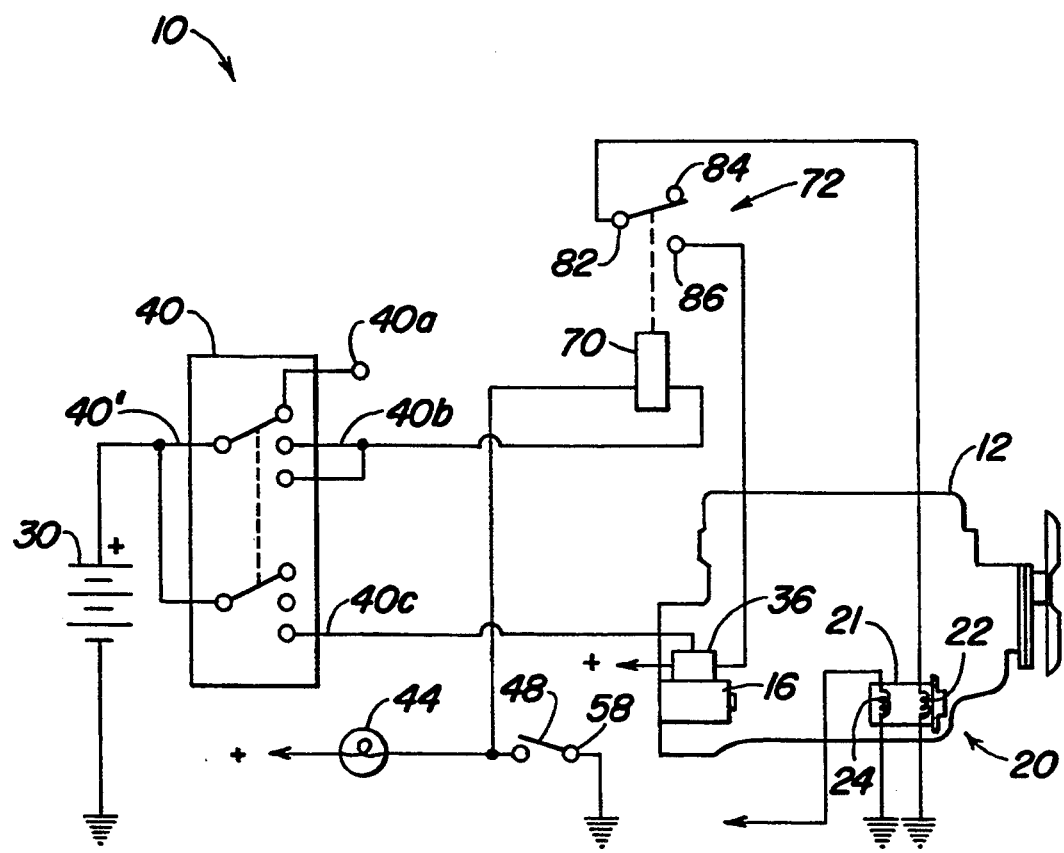

FUEL SHUT-OFF SOLENOID PULL-IN COIL RELAY

BACKGROUND OF THE INVENTION

1. Field of the Invention

The present invention relates generally to engines and, are specifically, to a circuit for operating a solenoid such as a fuel shut-off solenoid having a pull-in coil that is temporarily activated on start-up of the engine.

2. Related Art

Fuel shut-off solenoids often are used on diesel engines to interrupt fuel flow from the injection fuel pump when the ignition is switched off. On start-up of the engine, a solenoid pull-in coil must be temporarily activated to turn on the solenoid. The pull-in coil can draw up to approximately 50 amps. Once the solenoid is activated, a hold-in coil which has a much lower current draw than the pull-in coil maintains the solenoid in the on condition, and the pull-in coil is turned off to avoid overheating. A typical starting circuit has the pull-in coil connected to the start terminal on the ignition switch. If the key is held at the start period for an extended period of time or if the key sticks in the start position, the solenoid will overheat and can burn out and fail. Some starting circuits use a timer to limit pull-in coil activation time, but these circuits are more complex and expensive.

BRIEF SUMMARY OF THE INVENTION

It is therefore an object of the present invention to provide an improved circuit for the fuel shut-off of an engine. It is another object to provide such a circuit which eliminates solenoid overheating.

It is a further object of the present invention to provide an improved fuel shut-off circuit for an engine which reduces current draw when the engine has to be cranked for extended periods of time. It is a further object to provide such a circuit which is relatively simple and inexpensive in construction.

It is still another object of the present invention to provide an improved fuel shut-off circuit for an engine which advantageously utilizes an existing switch on the engine, such as the oil pressure indicator switch, to reduce or eliminate problems of solenoid overheating during start-up.

The pull-in coil of the fuel pump shut-off solenoid, which previously has been wired directly to the starter circuit, is now connected to a separate relay which in turn is connected to the source either through the starter relay or the ignition switch. To avoid pull-in coil overheating, the relay is opened after a short period of time as the result of a changing condition of the engine brought about by operation of the starter. Preferably, the condition is the increase of a pressure as the engine is being cranked. As the oil pressure increases during starting, the oil pressure warning light switch will open. By connecting the additional relay through the oil pressure switch to ground, the relay will only be activated a few seconds or less during start-up, that is, until sufficient oil pressure is built up during cranking to open the oil pressure switch. Therefore, pull-in coil overheating and the possible resulting solenoid failure are eliminated. The circuit is very simple, reliable and inexpensive and advantageously utilizes the existing oil pressure switch.

These and other objects, features and advantages of the present invention will become apparent to one skilled in the art upon reading the following detailed description in view of the drawings.

BRIEF DESCRIPTION OF THE DRAWINGS

The single drawing FIGURE is a schematic representation of an improved starting circuit constructed in accordance with the teachings of the present invention.

DETAILED DESCRIPTION OF THE DRAWINGS

Referring now to the drawing, therein is shown a circuit 10 for a diesel engine 12 having a starter 16 and a fuel pump system 20 with a shut-off solenoid 21 for selectively cutting off fuel flow to the engine when the engine ignition switch is turned off. The solenoid 21 includes a pull-in coil 22 and hold-in coil 24. A battery 30 or other source of electrical power is connected through a starter relay 36 to the starter 16, and to an input terminal 40' of an ignition switch 40. The switch 40 is a conventional ignition switch with an off position (40a terminal position), a run position (40b), and a start position (40c). The starter relay 36 is connected to the start terminal 40c of the ignition switch 40.

A conventional oil pressure light 44 is connected between the source 30 and a normally closed pressure responsive switch 48. The pressure responsive switch 48, which opens when the engine oil pressure rises above a preselected pressure, is also connected to ground at 58.

The run terminal 40b of the ignition switch 40 is connected to one side of a coil 70 of a relay 72. The opposite side of the coil 70 is connected to the oil pressure switch 48 so that there is a current path through the coil 70 to ground when the ignition switch is in either the start or run positions and the oil pressure is below the preselected minimum pressure (i.e., switch 48 is closed). The relay 72 has a terminal 82 connected to the pull-in coil 22. A pair of relay terminals includes a non-connected terminal 84 and a terminal 86 connected to the starter relay 36 (or alternatively, directly to the switch terminal 40c). The terminal 86 is connected to the source 30 via the relay 36 when the ignition switch 40 is moved to the start (40c) position. When the switch 40 is in the start position 40c or the run position 40b, and the oil pressure switch 48 closed, the relay 72 will be activated to provide a direct path from the starter relay 36 (or the terminal 40c) through the terminals 86, 82 and through the pull-in coil 22 to ground. The relatively large pull-in current is thereby provided to the pull-in coil 22 when the ignition switch 40 is moved to the start position so that the fuel pump solenoid 21 is activated to permit fuel flow to the engine. Once the fuel pump solenoid 21 is activated and pull-in current is terminated, the hold-in coil 24, which is connected to the source 30 when the switch 40 is in either the start or run position, maintains the solenoid 21 on with a relatively small hold-in current.

As soon as the oil pressure builds to a level above the preselected level, the switch 48 opens and interrupts power to the coil 70 to de-energize the relay 72, and a current path to the pull-in coil 22 is opened to cut off pull-in current and reduce solenoid current draw. Typically, the switch 48 opens after the engine is cranked only a short period of time (less than a second when the engine is warm, or a maximum of several seconds under cold start conditions). Therefore, fuel pump cut-out solenoid overheating is avoided, even if the switch 40 sticks in the start position or the starter 36 relay remains energized for any reason.

Having described the preferred embodiment, it will become apparent that various modifications can be made without departing from the scope of the invention as defined in the accompanying claims.

We claim:

1. In an engine having a source of current, an ignition switch connected to the source, a starter, and a fuel pump system including a solenoid having a pull-in coil for activating fuel flow during start up, a circuit comprising:
   a first relay connected to the source through the ignition switch and to the pull-in coil for selectively supplying pull-in coil current during engine starting;
   an oil pressure switch having a first condition when engine oil pressure is below a preselected level and a second condition when the oil pressure is above a preselected level; and
   wherein the relay is connected to the oil pressure switch and is responsive to the second condition for interrupting pull-in coil current after the oil pressure reaches a preselected level to thereby prevent overheating of the fuel pump solenoid.

2. The invention as set forth in claim 1 wherein the relay includes a first terminal connected to the pull-in coil and a second terminal connected to the starter for providing current to the pull-in coil only when the starter is activated and the oil pressure switch is in the first condition.

3. The invention as set forth in claim 1 wherein the fuel pump solenoid includes a hold-in coil for maintaining active fuel flow after the pull-in coil current is interrupted.

4. The invention as set forth in claim 1 wherein the starter includes a starter relay connected to the source and to the ignition switch, the first relay is connected to the starter relay so that pull-in current can only be provided when the starter is activated.

5. In an engine having a source current, an ignition switch having off, start and run positions and connected to the source, a starter, and a solenoid-controlled fuel pump system including a fuel pump solenoid having a pull-in coil for activating the fuel flow during start up and a hold-in coil for maintaining the fuel flow activation while the ignition switch is on, a relay circuit comprising:
   a first relay connected to the source through the ignition switch and to the pull-in coil for selectively supplying pull-in coil current during starting of the engine;
   a pressure switch having a first condition when engine is not running, and a second condition when the starter has been activated; and
   means connecting the first relay to the pressure switch for limiting the time the pull-in coil current is supplied to the pull-in coil.

6. The invention as set forth in claim 5 wherein the pressure switch comprises an oil pressure switch.

7. The invention as set forth in claim 6 wherein the oil pressure switch is a normally closed on-off switch, and first relay includes a coil having one terminal connected to the oil pressure switch and a second terminal connected to the ignition switch, the first relay responsive to the ignition switch being in the start position and the pressure switch being closed for providing the pull-in coil current.

* * * * *